United States Patent [19]

Boulton et al.

[11] Patent Number: 5,027,342
[45] Date of Patent: Jun. 25, 1991

[54] LOCAL AREA NETWORK

[75] Inventors: Peter I. P. Boulton; Ernest S. Lee, both of Islington, Canada

[73] Assignee: The University of Toronto Innovations Foundation, Toronto, Canada

[21] Appl. No.: 346,665

[22] Filed: May 3, 1989

[51] Int. Cl.$^5$ ............................................. H04Q 1/20
[52] U.S. Cl. ................................. 370/16; 340/825.02; 371/8.2
[58] Field of Search ................. 370/16, 60, 94.3, 85.9; 340/825.02, 825.03, 827; 371/8.2, 11.2

[56] References Cited

U.S. PATENT DOCUMENTS

| | | | |
|---|---|---|---|
| 4,264,894 | 4/1981 | Ellington | 340/147 |
| 4,276,643 | 6/1981 | Laprie et al. | 371/8 |
| 4,345,326 | 8/1982 | Dieudonne et al. | 370/60 |
| 4,347,498 | 8/1982 | Lee et al. | 340/825 |
| 4,354,267 | 10/1982 | Mori et al. | 371/11 |
| 4,417,334 | 11/1983 | Gunderson et al. | 370/85 |
| 4,514,843 | 4/1985 | Albanese | 340/825 |
| 4,570,162 | 2/1986 | Boulton et al. | 370/60 |
| 4,586,128 | 4/1986 | DeWoskin | 364/200 |
| 4,607,365 | 8/1986 | Greig et al. | 371/8 |
| 4,608,700 | 8/1986 | Kirtley, Jr. et al. | 375/36 |
| 4,630,254 | 12/1986 | Tseng . | |
| 4,680,776 | 7/1987 | Ikeuchi et al. | 375/40 |
| 4,701,756 | 10/1987 | Burr | 340/825 |
| 4,763,247 | 8/1988 | Borovski et al. | 370/60 |
| 4,763,329 | 8/1988 | Green | 371/11.2 |
| 4,773,069 | 9/1988 | Boulton et al. | 370/16 |
| 4,777,487 | 10/1988 | Boulton et al. | 370/94.3 |
| 4,839,887 | 6/1989 | Yano | 370/60 |

OTHER PUBLICATIONS

Electronics Week, vol. 57, No. 28, Oct. 1984, pp. 95-100, by H. Ikeman et al.
"Design and Analysis of Fault-Tolerant Multistage Interconnection Networks with Low Link Complexity", Conference Proceedings of the 12th Annual International Symposium on Computer Architecture, by V. P. Kumar and S. M. Reddy.

Primary Examiner—Douglas W. Olms
Assistant Examiner—Melvin Marcelo
Attorney, Agent, or Firm—Fleit, Jacobson, Cohn, Price, Holman & Stern

[57] ABSTRACT

A local area network is provided with increased tolerance to faults by arranging multiple hubs in nodes in the network. Internal connections in each hubs of the same node upon detection of a failure to provide an alternate path for data transmission in the network.

8 Claims, 13 Drawing Sheets

LOCAL AREA NETWORK

A local area network enables a plurality of data processing devices to communicate with one another and transfer data between the devices. Networks can take a number of different topologies such as a linear, ring, ladder or a tree network. This latter arrangement provides a network in which a plurality of data-handling devices communicate with a central hub that controls passage of the information by selecting one of the devices to be broadcast to all the others. The hubs may be arranged as branches so that the output from the selection side of one hub forms the input to the selection side of a subsequent hub. In this manner a large number of devices may be served in an orderly manner.

The general configuration of such networks is described more fully in U.S. Pat. No. 4,570,162 entitled "Local Area Network" and issued to the present applicants. This particular patent addresses the manner in which selection of a single device is ensured and provides full details of the configuration of such networks and the particular arrangement of hub that may be utilized to achieve an operable arrangement. The contents of this earlier issued U.S. patent are incorporated herein by reference.

A further enhancement in the arrangement of hub described in the U.S. Pat. No. 4,570,162 is shown in U.S. Pat. No. 4,777,487 which describes a hub arrangement to ensure a deterministic processing of the transmission request made to a hub. The contents of this earlier issued patent are also incorporated herein by reference.

A feature of the networks described above and in the earlier issued patents is that the loss of a data link to or from the hubs can cause failure or isolation of a substantial part of the network. One solution to this problem is addressed in earlier issued U.S. Pat. No. 4,773,069 entitled "Robust Rooted Tree Network" issued to the present applicants. The approach taken in this patent is to replicate hubs at critical locations and to provide an output from one hub as the input of another hub. In this way redundancy is achieved in the network in a relatively simple manner. However the redundancy is obtained by replication of a substantial portion of the network and whilst this is effective it may not be convenient in all situations.

It is therefore an object of the present invention to provide a network in which a desired degree of redundancy is obtained permitting the network to survive a predetermined number of failures, whilst obviating or mitigating the above disadvantages.

According therefore to the present invention there is provided a local area network comprising a plurality of access ports connected by data links to one of a plurality of nodes, each node having at least one hub with each hub including a selector to select one said links for transmission through said network and broadcast means to transmit data to each of the links connected to said hub, at least one of said nodes being a multiple hub node having a plurality of hubs with each hub having a separate data link to at least one other hub, internal transmission means to interconnect hubs of multiple hub node, switch means to control internal transmission hub node, switch means to control the internal transmission means and detector means to detect a failure in the said data link from one of hubs of said multiple hub node and operate said switch means to establish communication through said internal transmission means to a hub of said multiple hub node.

Embodiments of the invention will now be described by way of example only with reference to the accompanying drawings in which.

Figure 1:
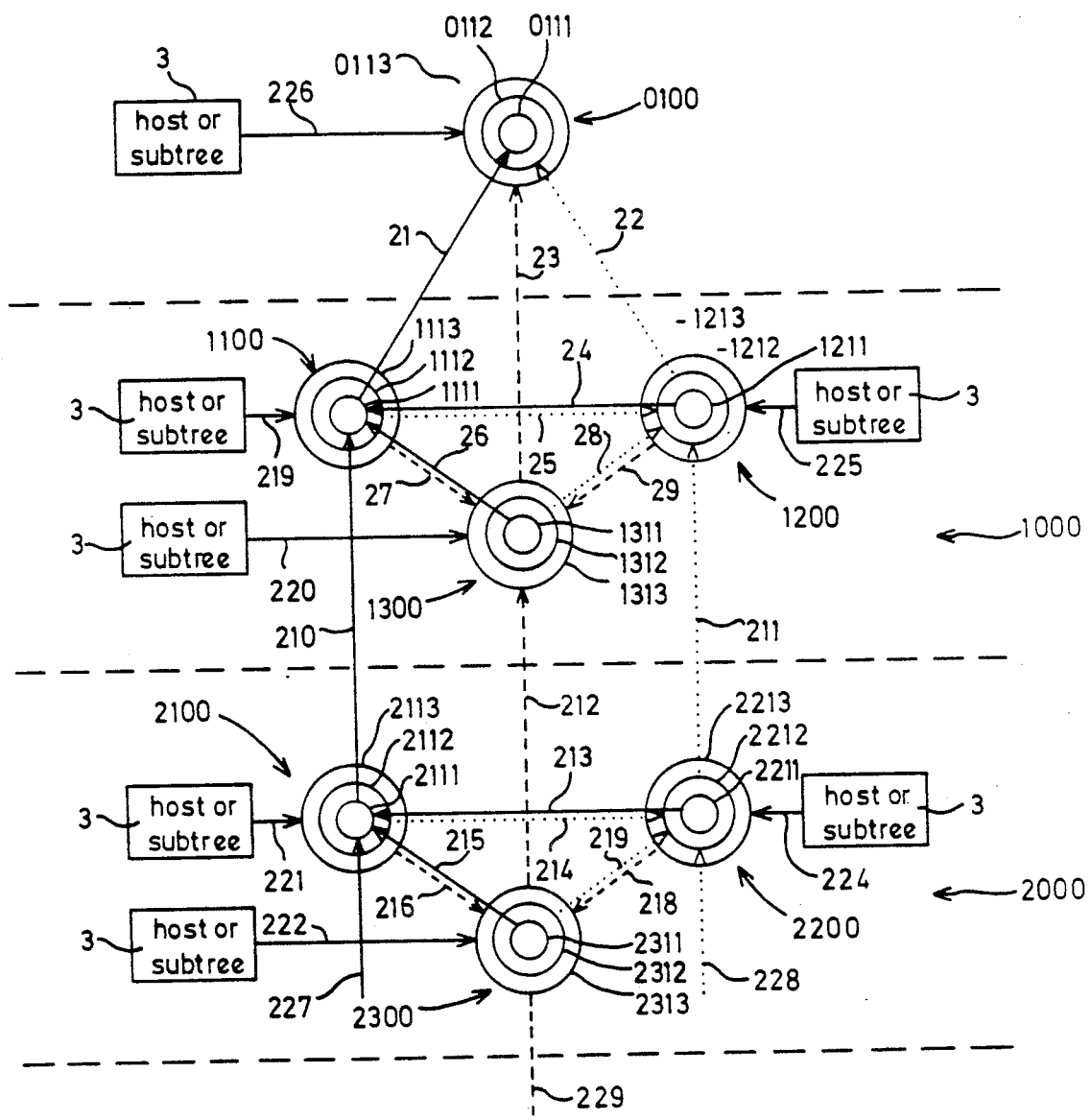
FIG. 1 is a schematic abstraction of a local area network exhibiting tolerance to two at least failure of components.

Referring therefore to FIG. 1, a local area network 1 is ordered in stages 0; 1000, 2000 . . . n000 with each stage being formed from one or more nodes 100, 200, 300 . . . p00. Each of the nodes p00 is formed with a plurality of hubs 10 which are ordered hierarchically within the node as denoted by the value of the unit digit 1, 2, 3, etc. to establish 'levels' of hubs within each node. The highest level, level 1, is denoted in FIG. 1 by the smallest cicle, with successive levels indicated by progressively larger circles. Thus hub 1111 is the highest level hub of the first node of the first stage of the network 1. Similarly hub 2313 is the lowest level hub (level 3) of the third node of the second stage of the network 1. This numbering convention has been adopted for ease of description and should not be considered as limiting the number of stages, nodes or hubs.

The hubs 10 of the respective nodes p00 are interconnected by external links 2, each of which comprises an uplink fibre 8 and a downlink fibre 9 so that the links 2 can transmit data in both directions between the hubs. Connected by links 2 to each of the hubs 13 of the p00 nodes are hosts 3 that serve as access ports to connect additional data processing apparatus such as a terminal or computer. The notation '2' will be used to identify links generically with specific links identified by numeric subscripts as appropriate, i.e. $2_1$ $2_2$, etc.

Figure 2:
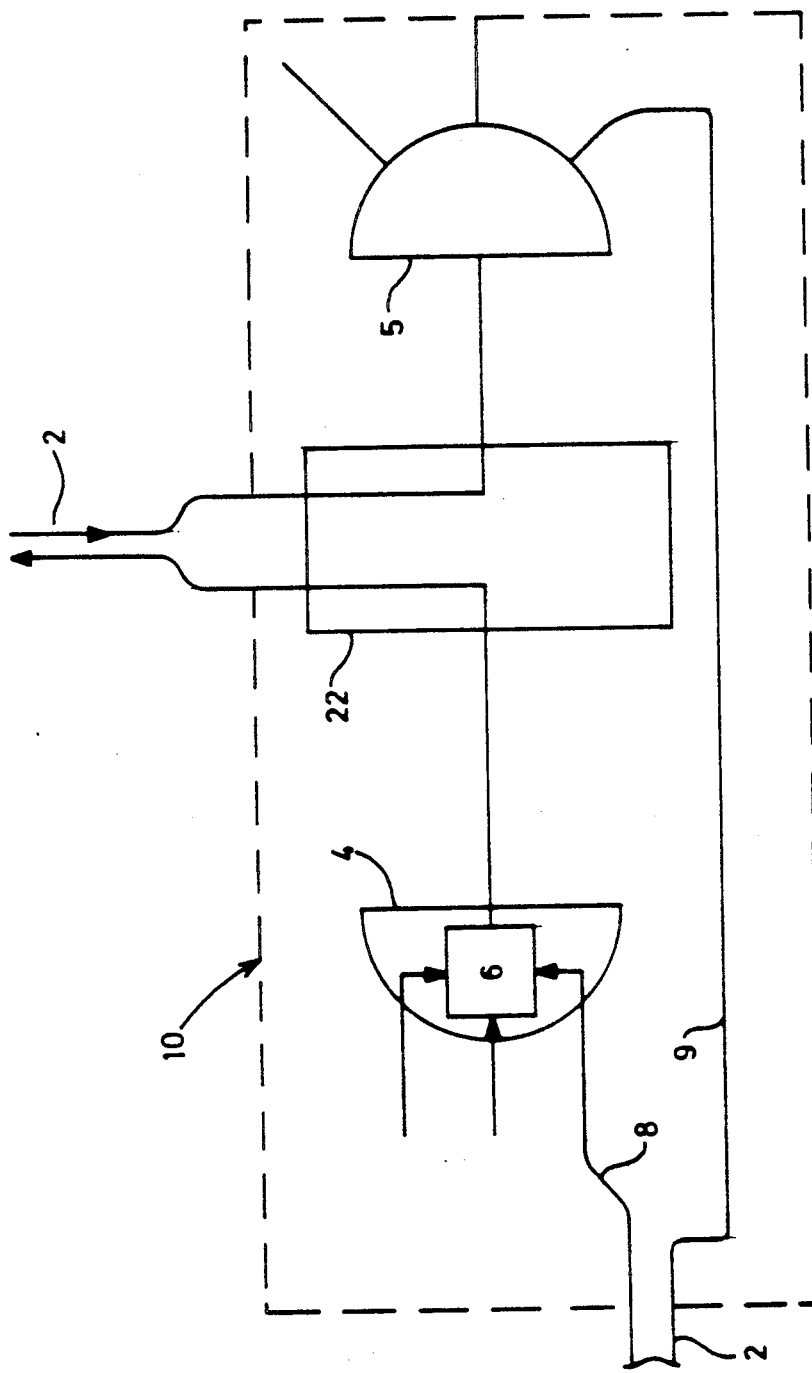
FIG. 2 is schematic representation of a hub utilized in the network of FIG. 1.

Each of the hubs 10 is shown in further detail on FIG. 2 and comprises a selector 4 and a broadcast unit 5. The uplink fibre 8 is connected to the selection unit 4 and the downlink fibre 9 connected to the broadcast unit 5. The output from the selection unit 4 is transmitted to the uplink fibre 8 of a link 2 that is connected externally to another hub 10 in a different node p00. The downlink fibre 9 of the link 2 is connected to the input side of the broadcast unit 5 so that the data carried by that link is transmitted to each of the downlink fibres 9 connected to the broadcast unit 5.

Figure 3:
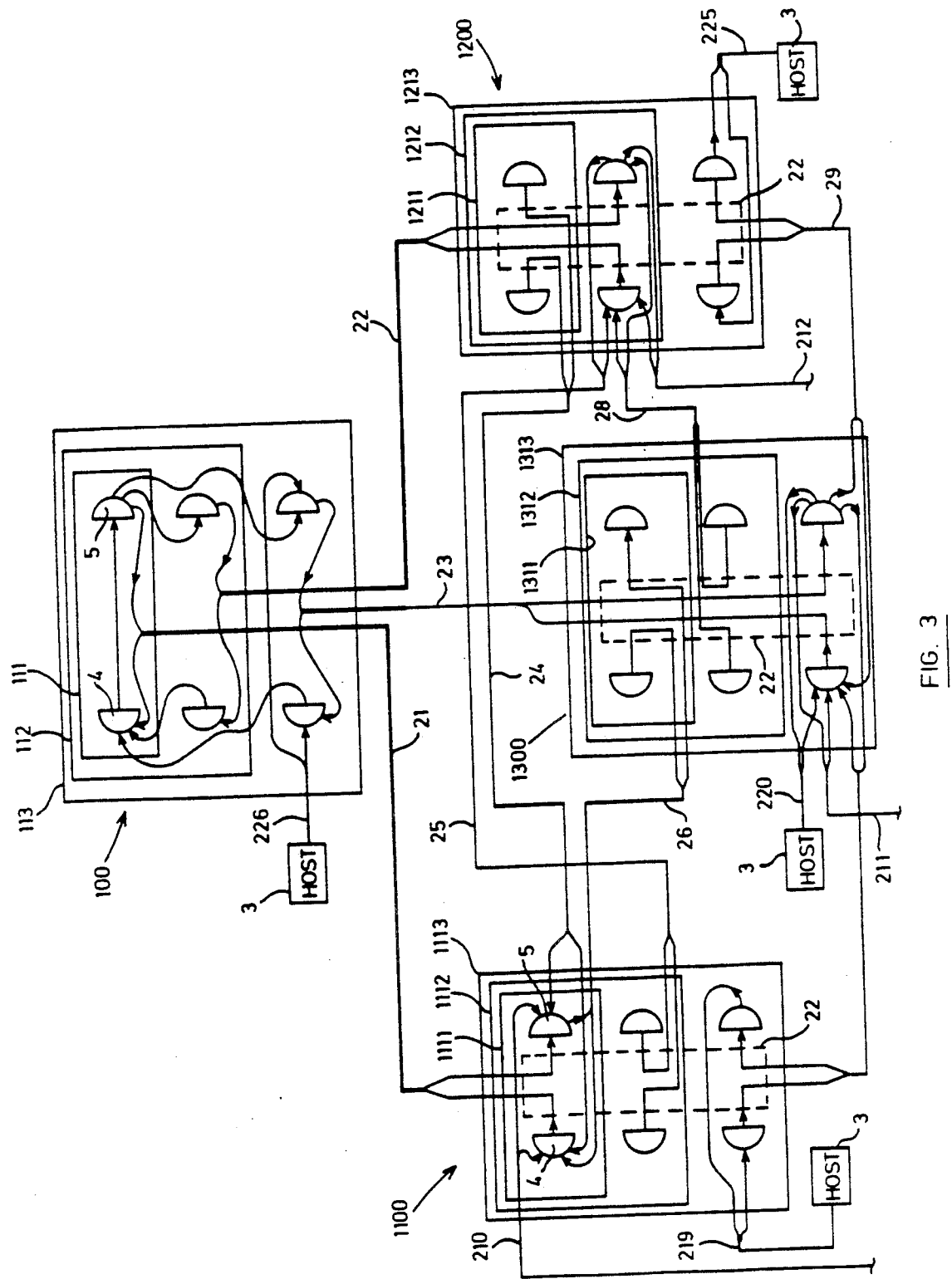
FIG. 3 is a schematic representation of a portion of the network shown in FIG. 1 showing internal connections between the components of the network shown in FIG. 1.

As is shown schematically in FIGS. 2 and 3, an internal switching unit 22 is interposed between the selector 4 and the broadcast unit 5 of each of the hubs 10. The connections illustrated in FIG. 3 are the normally established connections assuming that the network is operating without any failures. The selector 4 includes an arbitration unit 6 which may conveniently be of the form shown in the U.S. Pat. Nos. 4,570,162 and 4,777,487 to regulate selection and transmission of the data on the links 2.

In FIG. 1, the uplink direction of the links 2 is indicated by an arrow. The uplink direction is the direction in which data selected by selector 4 of one hub is transmitted to the input of the selection 4 of another hub and indicates the direction by which the data proceeds toward the zeroth stage. The hub to which data is transmitted in the uplink direction is referred to as the 'parent' of the hub transmitting the data.

Using the above convention, the general arrangement of the network 1 is shown in FIG. 1. The external connections between the components of the zero'th and 1st stage 1000 of the network 1 is illustrated in more detail in FIG. 3. The network 1 is organized as a tree network with nodes 0100 acting as the central node through which all data must pass in normal circumstances to be transmitted. A link $2_1$ established connection between the hub 1111 of the first stage and the hub 111 of the central node 100. The selector 4 of hub 111 is directly connected to the broadcast unit 5 of the hub 111 and therefore constitutes the nexus for the network 1. Thus a message selected by the hub 1111 will be considered by the selector 5 of hub 111 and, if selected, will be transmitted across the nexus to the broadcast unit 5 of hub 111 for transmission to each of the other hubs 10 in the network 1.

Similarly, as shown in FIG. 1 and in more detail in FIG. 3, link $2_2$ extends between hubs 1212 and 112 and link $2_3$ extends between hubs 1313 and 113 to establish links between the first stage 1000 and the zero stage. Within the first stage, links $2_4$, $2_5$, $2_6$, $2_7$, $2_8$ and $2_9$ are established between hubs 1211 and 1111; hubs 1112 and 1212; hubs 1311 and 1111; hubs 1113 and 1313; hubs 1312 and 1212; and hubs 1213 and 1313 respectively.

linkwise links $2_{10}$, $2_{11}$ and $2_{12}$ between the second stage and the first stage are established between hubs 2111 and 1111; hubs 2212 and 1212; and hubs 2313 and 1313 respectively. In addition, links $2_{13}$ to $2_{18}$ establish connections within the stage are similar to those set out above with respect to the first stage. Additional stages may be included through links $2_{27}$, $2_{28}$ and $2_{29}$ connected to respective hubs of the second stage 2000.

It will be noted therefore that each of the hubs 10 is connected externally to another hub 10 in a different node. It will also be noted that each of the hosts 3 is connected by links $2_{19}$–$2_{26}$ respectively to the lowest level hub 13 of each node p00 to gain access to the network.

In normal operation, each of the hubs 13 will receive one or more requests for access to the network, the selection units 4 will select the request that is to proceed and transmit that request to the hub 13 to which it is connected by the link 2. A similar process will occur at each hub 13 to which the message is transmitted until the message is received at the selector 4 of hub 113. The higher level hubs 11, 12 are not utilized for data transmission in the stages 1000, 2000 under normal operation, but may be used if a failure occurs in one of the link 2. Data received at the hub 0113 of central node 0100 is however processed through each of hubs 0111 and 0112 to ensure that transmission occurs at each level of hub 10.

Within the central node 100, the output of selector 4 of hub 113 is connected as an input to the selector 4 of hub 112. Likewise, the output of selector 4 of hub 112 is connected as an input to the selector 4 of hub 111 so that data received at either hub 112 or 113 will, if selected, cascade to the hub 111 for broadcast to each of the hubs in the network 1.

For optimum network configuration, it has been found that the following criteria should be used in determining the connection between hubs:

(a) Each hub is connected by a link to a parent hub in another node.
(b) Each node in stage k includes only one hub with a parent in stage k-1.
(c) The remaining hubs in each node in stage k each have a different parent hub in stage k.
(d) In all cases a level i hub in one node has a i parent in a different node.

Expressed using the notation to identify stages, nodes and hubs as set out above:

for stage k; $k \geq 0$
node i; $1 \leq i \leq m$
hub lj; $1 \leq j \leq m$
then if $k > 1$ it follows:
(a) if i=j then kili has its parent hub (k-1)ili
(b) if i≠j then kilj has as its parent hub kjlj.
If k=1 it follows:
(a) if i=j then lili has as its parent 0lli
(b) if i≠j then kilj has as its parent hub kjlj.

Figure 4:
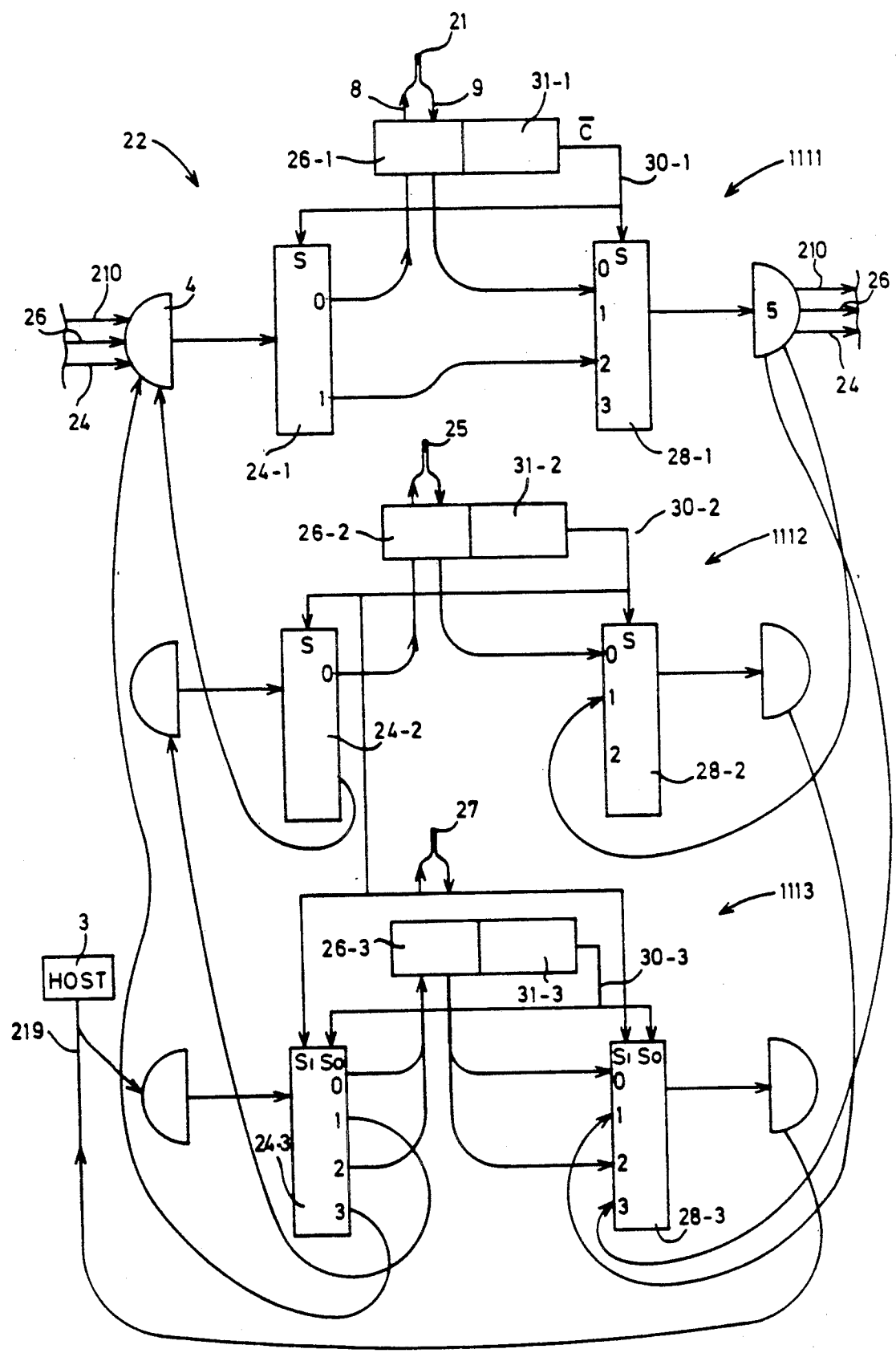
FIG. 4 is a schematic representation of a portion of the network shown in FIG. 3 with internal connections illustrated.

To prevent failure of a substantial portion of the network 1, the switch means 22 is provided within each of the node p00 to monitor the links 2 connected to the hubs 10 of that node and establish alternate connections upon such failure. The switch 22 also establishes the hierarchial order or relative level of the hubs 10 in each node p00 to facilitate orderly operation of the network 1. The operation of the switch 22 is shown in FIG. 4 which illustrates the external connections associated within node 1100. The condition shown for the switch 22 applies to each of the multiple hub nodes although the external connections to each of the hubs in that node will of course vary between the nodes.

Referring therefore to FIG. 4, the switch means 22 includes for each hub 10 a demultiplexer unit 24 receiving its input from the selector 4 and the "zero" output connected through an optoelectronic coupler 26 to the uplink fibre 8 of external link $2_1$. The downlink fibre 9 of link $2_1$ is similarly connected through the optoelectronic coupler 26 to the "zero" input of demultiplexer 28. The output of multiplexer 18 is connected to the input of the broadcast unit 5.

The demultiplexer 24 and multiplexer 28 are controlled by a set signal 30 derived from a detector 31 that monitors the presence or otherwise of the carrier signal at the optoelectric coupler 26. Under normal operation, that is when a carrier signal is present, the output of detector 31 is low so that the multiplexer 24 establishes connections from the output of selector 4 its "zero" terminal and from the "zero" terminal of demultiplexer 28 to the broadcast unit 5. In the event that the detector 31 cannot detect a carrier signal, indicating a failure in the link 2, then the set signal 31 operates through the demultiplexer 24 and multiplexer 28 to establish an alternative path. The alternative path selected will depend on the level of hub being controlled as will be described below. For clarity of description, a suffix indicating the level of hub, i.e. 1, 2 or 3 will be added to each component in the switch 22.

The hierarchial order of the hubs 10 within the node p00 is determined by the internal connections of the switch 22. The highest level hub, hub 1111 in FIG. 4 has an internal connection 29 between the "1" terminal of demultiplexer 24-1 and the "1" terminal of multiplexer 28-1 so that in the event of a failure in the link $2_1$, the set signal 30-1 goes 'high' to establish a direct link between selector 4-1 and broadcast unit 5-1.

The second level hub, 1112, provides a connection from the "1" output of the demultiplexer 24-2 to the input of selector 4 of hub 1111. Likewise, an output from the broadcast unit 5 of hub 1111 is connected as the "1" to demultiplexer 28-2 of hub 1112. Upon a fault being detected in link $2_5$, the set signal 30-2 goes 'high' to route data selected by selector 4 of hub 1112 through the hub 1112 where it is transmitted through link $2_1$ connected between hub 1111 and hub 111. Similarly, data received at broadcast unit 5 of hub 1111 will be directed to the input of broadcast unit 5 of hub 1112 for further transmission.

The third level hub, 1113, is controlled not only by set signal 30-3 from its own detector 31-3 but also receives the set signal 30-2 from the detector of hub 1112. The demultiplexer 24-3 and multiplexer 28-3 are four way multiplexers with the "zero" and "two" connections respectively connected directly to the optoelectric coupler 16-3. Connections are also made between the "1" terminals of demultiplexers 24-3 and multiplexer 28-3 and the selector 4-2 and broadcast unit 5-2 of the next highest level hub 112. The "3" terminals of demultiplexer 24-3 and multiplexer 28-3 are likewise connected to the selectors 4-1, 5-1 of hub 1111.

The operation of the demultiplexer 24 and multiplexer 28-3 is controlled in accordance with the following truth table:

| Case | Set 30-2 | Signal 30 | Demux Output | Mux Input | Connection to (link) |
|---|---|---|---|---|---|
| a | 0 | 0 | 0 | 0 | Normal ($2_7$) |
| b | 0 | 1 | 1 | 1 | Hub 1112 ($2_5$) |
| c | 1 | 0 | 2 | 2 | Normal ($2_7$) |
| d | 1 | 1 | 3 | 3 | Hub 1111 ($2_1$) |

It will be noted that since the output #2 of the demultiplexer/multiplexer is also connected to the optoelectric coupler 16-3, the normal link $2_7$ is selected in both cases, i.e. a, and C when there is no evidence of carrier loss in the link $2_7$ associated with that hub. Level 2 hub 1112 is selected if the link $2_1$ of hub 111 has failed and if the links $2_1$, $2_5$ of both hub 1112 and 1113 have failed then hub 1111 will be selected. This will occur even if level 1 is not operational providing the minimum protection from at least two failures.

The operation of the node 1100 will be described assuming initially that no faults are present and that no data is being transmitted. Host 3 connected to hub 1113 by link 219 initiates data transmission that is selected by selector 4 of hub 1113 and transmitted through demultiplexer 24-3 to link $2_7$. It is transferred through hubs 1313 to hub 113 and from there to selector 4 of hub 111. The data is transmitted across the nexus to be broadcast throughout the network 1.

If one of the lines 2 used in the data transmission is damaged, e.g. the line $2_7$ connecting hub 1113 with hub 1313 is damaged, the set signal 30-3 goes high and operates to connect the output of demultiplexer 24-3 with the selection unit 5 of hub 1112. Hub 1112 then transmits the data through its link $2_5$ to hub 1212 and then to hub 112 from where it is transferred to hub 111 and across the nexus.

Similarly, if link $2_5$ connecting the hubs 1112 and 1212 is damaged, a high signal is obtained from each of the set signals 30-2 and 30-3 causing the connections from demultiplexer 24-3 and multiplexer 28-3 to be established with the selector 4 and broadcast unit 5 of hub 111 respectively. Data is then transmitted from host 3 through hub 1113 to hub 1111 and on the hub 111 directly. Thus the network has survived two major faults. A similar effect will of course occur at each node. For example, if the line $2_7$ connecting hub 1113 and hub 1313 is damaged then transmission is directed between hubs 1112 and 1212 as indicated above. If line $2_2$ connecting hub 1212 with hub 112 is then damaged, node 1200 will reconfigure itself to connect hub 1212 with hub 1211 by operation of set line 30-2 in the switch 22 of node 1200. Transmission will then occur between hubs 1211; 1111 and 111 to gain access to the nexus.

It will be noted that the network configuration described above essentially provides three levels of communication with data being confined to the lowest level until a failure occurs. Upon one failure occurring, data is handled in the next highest level as it proceeds from the point of failure toward the central hub and upon a second failure occurring in the same path, data will be handled at the highest level providing tolerance for at least two failures within the network. A failure in a link 2 connecting a host 3 to a not p00 will isolate that host but will not be considered a failure by the network 1.

In certain instances, more than two failures in the network can be tolerated, for example, when damage occurs to the line $2_2$ between hub 1213 and 113 in addition to that discussed above. In this situation, data transmitted at host 3 to hub 1111 will still be directed to hub 111 though hubs 1112, 1312, 1311 and 1111 and data received at hub 1213 from host 3 will be directed through hub 1212 to hubs 1312, 1311, 1111 to hub 111. For the configuration of FIG. 1, at least two failures may be tolerated.

It will readily be appreciated that the central node 100 is simply provided by the switch 22 reverting to the condition shown as case d in the truth table above. This is a result of the hubs 111, 112 and 113 not having a link 2 and therefore not having a carrier signal to maintain the set signal 30 low. A failure in any of the hubs in central node 100 will isolate that node as the hubs 111, 112, 113 do not have the ability to reconfigure themselves. In this event each of the links $2_1$, $2_2$, $2_3$ detect the absence of a carrier signal causing the nodes 1100, 1200 and 1300 to reconfigure.

Hub 1111 will reconfigure so that selector 4 is directly connected to broadcast unit 5 to establish a nexus for the network. Hub 1212 reconfigures to establish internal connections to hub 1211 which in turn is connected through link $2_7$ to hub 1111, the new nexus for the network 1. Similarly, hub 1313 will reconfigure established connections to hub 1312 and hence via link $2_8$ to hub 1212, hub 1211 and on link $2_4$ to hub 1111. Thus data received from host 3 on link $2_{19}$ will be directed along links $2_7$, $2_8$ and $2_4$ to the new nexus in hub 1111 from broadcast over the network 1. Examination of the network 1 will show that the reconfiguration will enable data to be handled from other hosts in the network.

The above arrangement provides a simple symmetrical arrangement for each of the nodes p00 but does have the disadvantage that a failure in the central node 100 will isolate a host 3 connected to that node, e.g. the host on link $2_{26}$. Whilst this may normally be tolerated within the context of a local area network, it can be avoided by adopting an alternative configuration of central node 100 shown in FIG. 5.

Figure 5:
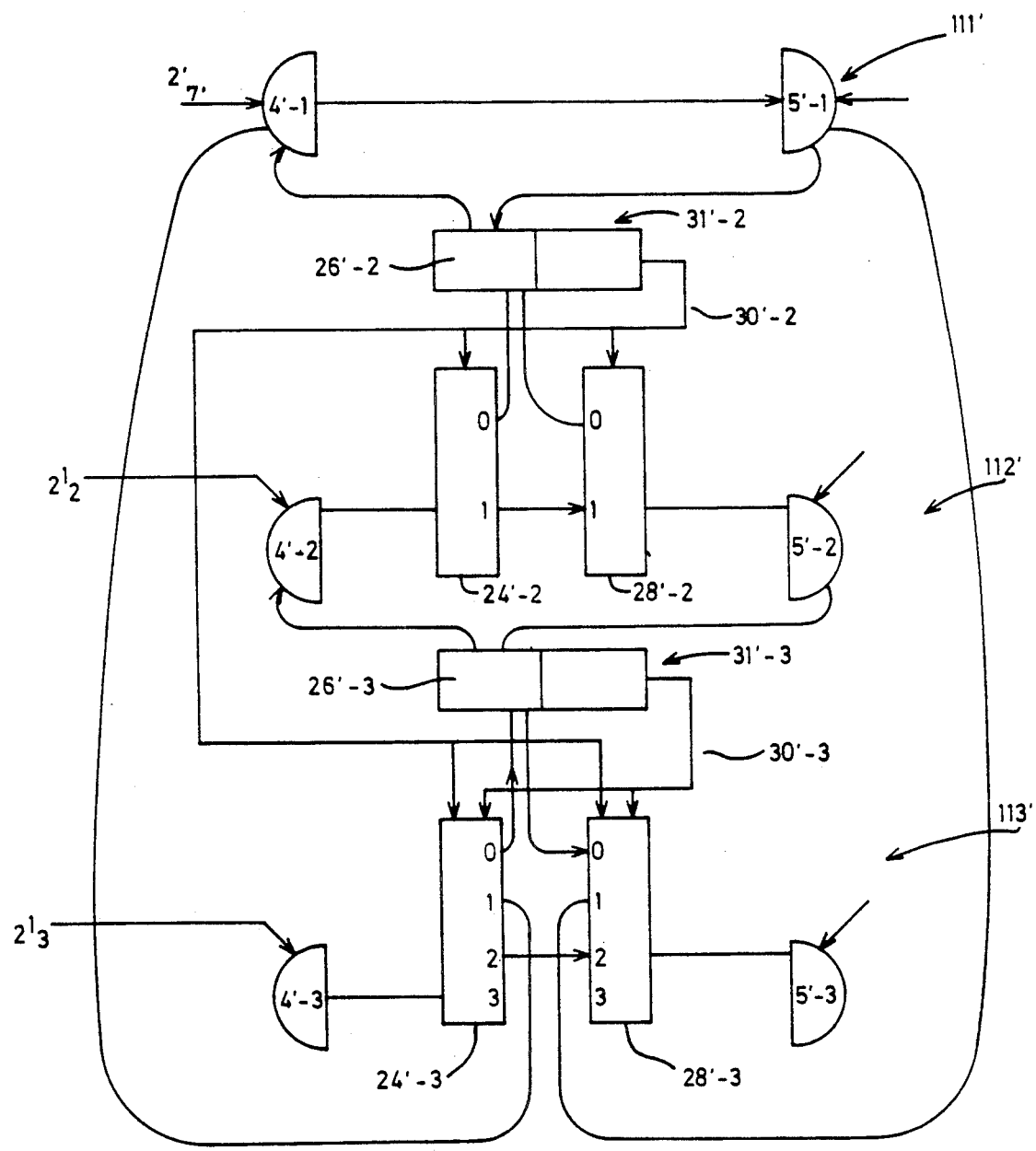
FIG. 5 is a representation similar to FIG. 3 of an alternative arrangement of internal connections for one component shown in FIG. 1.
Figure 6:
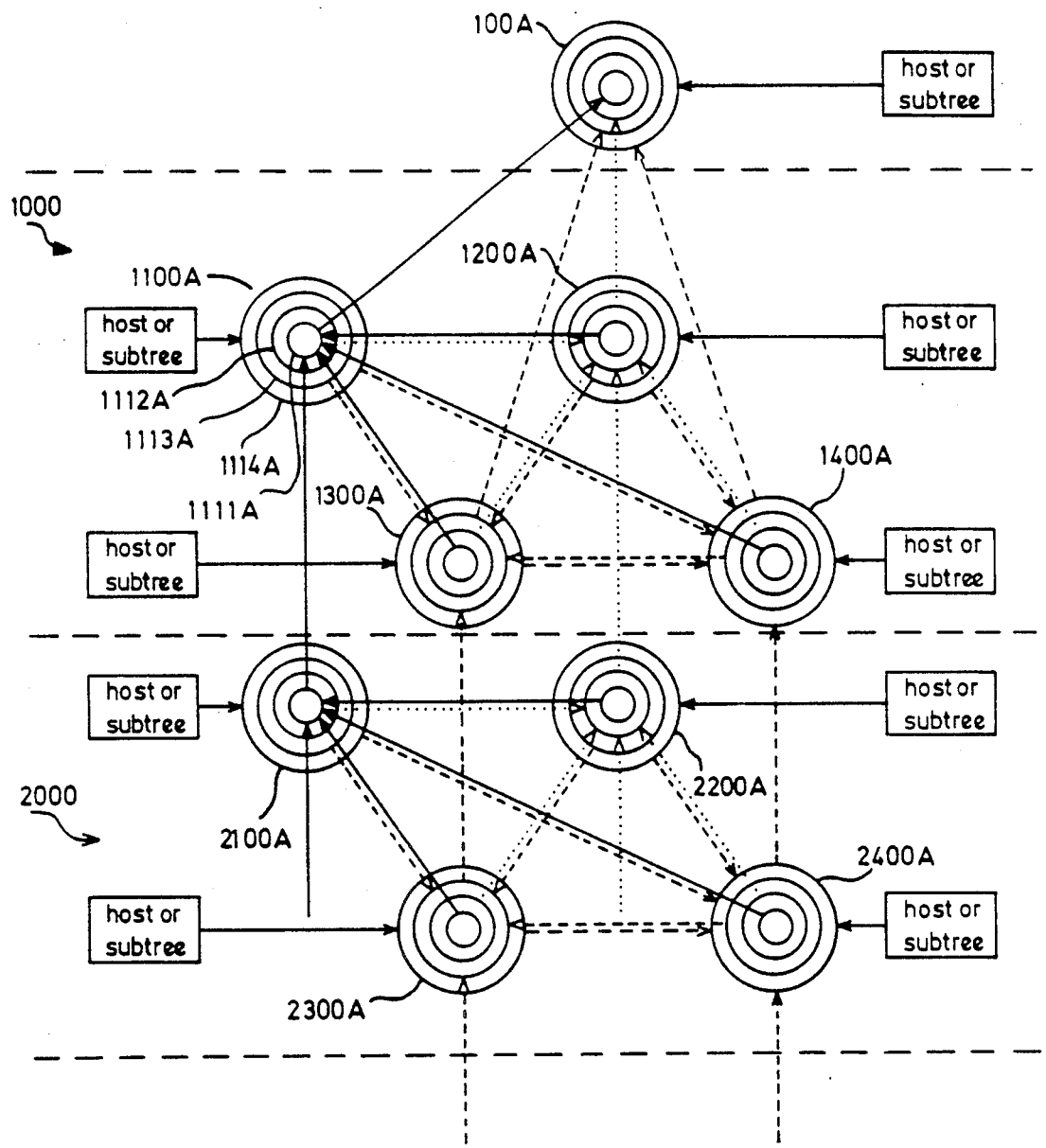
FIG. 6 is an abstraction similar to that shown in FIG. 1 of a network exhibiting tolerance to at least three failures.

In the arrangement shown in FIG. 5, like reference numerals will be used to denote the components with a prime' added for clarity.

Demultiplexer 24'-3 is configured to provide a normal connection through optoelectronic coupler 16'-3 to hub 112 and an alternative path from the '1' terminals of the demultiplexer 24'-3 and multiplexer 28'-3 to the selector 4'-1 and broadcast unit 5'-1 of hub 111. The '2' terminals are interconnected to provide a nexus for the hub 113.

Demultiplexer 24'-2 is connected through an optoelectronic coupler 16'-2 to the selector 4'-1 of hub 111' and similarly the broadcast unit 5'-1 of hub 111' is connected through coupler 16'-2 to the multiplexer 28'-2. An alternative data path is established between the "1" terminals of the demultiplexer 24'-2 and 28'-2 controlled by a set signal 31'-2. In the event of a failure of the hub 111, the set signal 30'-2 will establish the alternative connection allowing hub 112 to serve as a nexus.

The demultiplexer 24'-3 and multiplexer 28'-3 are controlled in accordance with the following truth table:

| Case | Set Signal 30'-2 | Set Signal 30'-3 | Demux. | Mux. | Connection to |
|---|---|---|---|---|---|
| a | 0 | 0 | 0 | 0 | 112 |
| b | 1 | 0 | 0 | 0 | 112 |
| c | 0 | 1 | 1 | 1 | 111 |
| d | 1 | 1 | 2 | 2 | 113 |

It will be appreciated with this arrangement that the host connected to hub 113 will be maintained in the network in the event of a failure of either hub 111 or 112.

Figure 7:
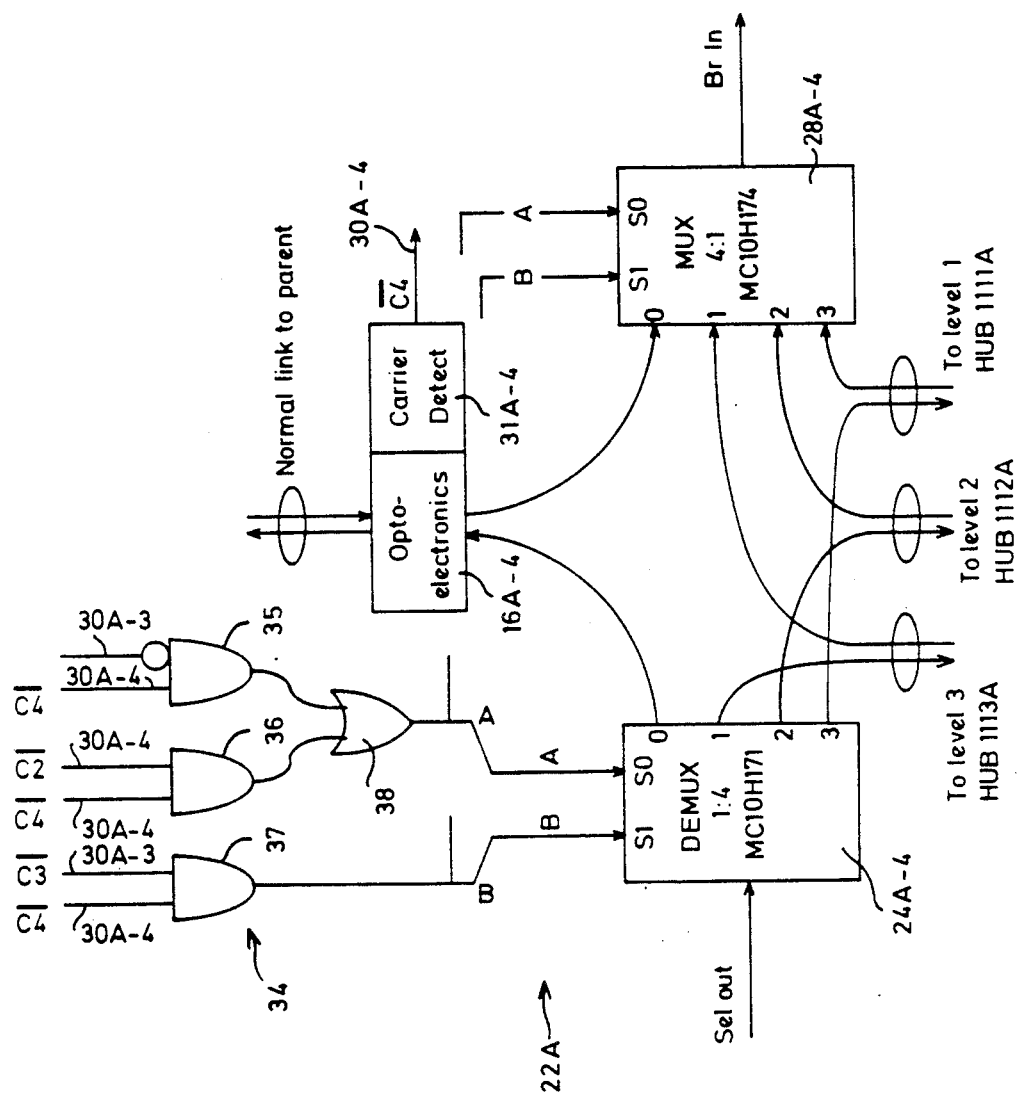
FIG. 7 is a representation similar to that of FIG. 4 showing the additional components required to implement the network shown in FIG. 6.

Enhanced survivability may be obtained by extension of the concept shown in FIGS. 1-4 above. A schematic representation of a network exhibiting survivability for a minimum of three failures is shown in FIG. 5. A similar numbering scheme to that used in FIGS. 1-4 will be utilized with a suffix A added for clarity. In the arrangment shown in FIG. 5, each of the nodes p000A utilizes four hubs 11A, 12A, 13A and 14A. Links 2A are established between the hubs 10A satisfying the general rules of connectivity set out above. The internal connections between the hubs 10A of each node is similar to that shown in FIG. 4 with an additional level of switch 22A as shown in FIG. 7. In the arrangement of FIG. 7, demultiplexer 24A-4 and multiplexer 28A-4 are utilized with the zero outputs being connected through the optoelectronics to the link 2A. The remaining three connections on the demultiplexer 24A-4 and multiplexer 28A-4 are connected to hubs 13, 12 and 11 respectively of the same node p00A. Control for the demultiplexer 24A-4 and multiplexer 28A-4 is provided through set signals 30-1, 30-2, 30-3, 30-4 applied to the two control inputs of the demultiplexer 24A-4 and multiplexer 28A-4. The set signals 30 are applied to a logic array 34 to derive the two set signals required for operation of the switch. The logic array 34 includes three AND gates, 35, 36 and 37, with one of the inputs to AND gate 35 being inverted. The output of AND gates 35 and 36 are ganged through an OR 38 gate to provide one of the inputs to the demultiplexer 24A-4 and multiplexer 28A-4.

The logic array 34 implements the truth table set out below:

TABLE A

| Case | Set Signals 30-2 | 30-3 | 30-4 | Control Values S1 | S0 | Mux/DeMux Selection | Connection Selected |
|---|---|---|---|---|---|---|---|
| a | 0 | 0 | 0 | 0 | 0 | 0 | Normal |
| b | 0 | 0 | 1 | 0 | 1 | 1 | Hub 13A |
| c | 0 | 1 | 0 | 0 | 0 | 0 | Normal |
| d | 0 | 1 | 1 | 1 | 0 | 2 | Hub 12A |
| e | 1 | 0 | 0 | 0 | 0 | 0 | Normal |
| f | 1 | 0 | 1 | 0 | 1 | 1 | Hub 13A |
| g | 1 | 1 | 0 | 0 | 0 | 0 | Normal |
| h | 1 | 1 | 1 | 1 | 1 | 3 | Hub 11A |

It will be seen that his arrangement implements a switching arrangement that will provide alternative routing for data in the event of at least three failures. Again, the network 1A may survive more than three failures, but it is guaranteed that the network will survive at least three failures.

Figure 8:
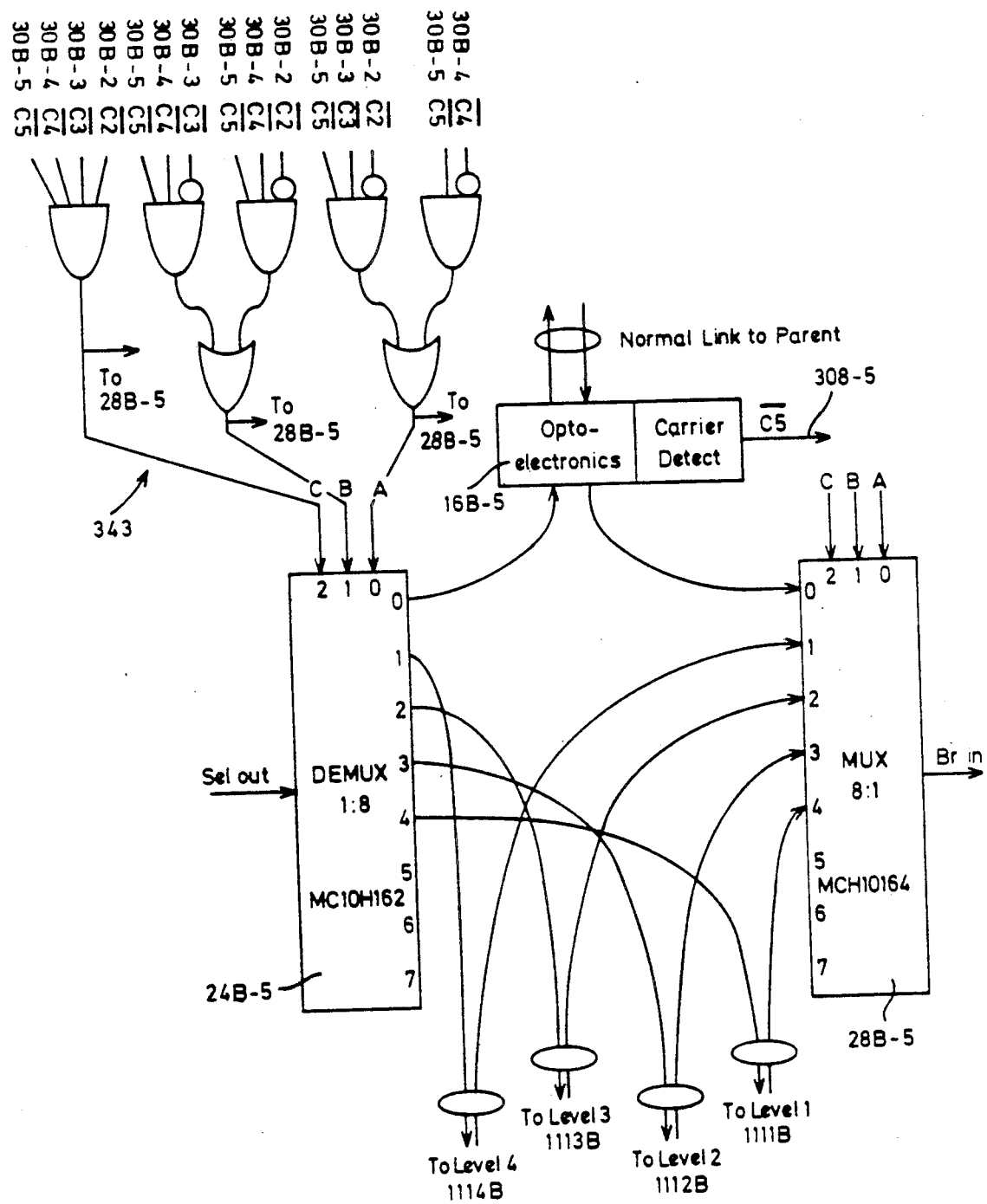
FIG. 8 is a schematic representation similar to FIG. 7 showing the additional components required to implement a network exhibiting tolerance to at least four failures.

Extension of this principle to a network capable of surviving four failures is shown in FIG. 8. Like reference numerals to those in FIGS. 1-7 are used to denote like components with a suffix B added for clarity. In this arrangement the logic array 34B provides three contol signals to the demultiplexer 24-5B and multiplexer 28-5B and implements the control logic shown in the truth table below:

TABLE B

| Case | Set Signals 30-2 | 30-3 | 30-4 | 30-5 | Control Values S2 | S1 | S0 | Mux/Demux Selection | Connection Selected |
|---|---|---|---|---|---|---|---|---|---|
| a | 0 | 0 | 0 | 0 | 0 | 0 | 0 | 0 | Normal |
| b | 0 | 0 | 0 | 1 | 0 | 0 | 1 | 1 | Hub 14B |
| c | 0 | 0 | 1 | 0 | 0 | 0 | 0 | 0 | Normal |
| d | 0 | 0 | 1 | 1 | 0 | 1 | 0 | 2 | Hub 13B |
| e | 0 | 1 | 0 | 0 | 0 | 0 | 0 | 0 | Normal |
| f | 0 | 1 | 0 | 1 | 0 | 0 | 1 | 1 | Hub 14B |
| g | 0 | 1 | 1 | 0 | 0 | 0 | 0 | 0 | Normal |
| h | 0 | 1 | 1 | 1 | 0 | 1 | 1 | 3 | Hub 12B |
| i | 1 | 0 | 0 | 0 | 0 | 0 | 0 | 0 | Normal |
| j | 1 | 0 | 0 | 1 | 0 | 0 | 1 | 1 | Hub 14B |
| k | 1 | 0 | 1 | 0 | 0 | 0 | 0 | 0 | Normal |
| l | 1 | 0 | 1 | 1 | 0 | 1 | 0 | 2 | Hub 13B |
| m | 1 | 1 | 0 | 0 | 0 | 0 | 0 | 0 | Normal |
| n | 1 | 1 | 0 | 1 | 0 | 0 | 1 | 1 | Hub 14B |
| o | 1 | 1 | 1 | 0 | 0 | 0 | 0 | 0 | Normal |

TABLE B-continued

| | Set Signals | | | | Control Values | | | Mux/ Demux | Connection |
|---|---|---|---|---|---|---|---|---|---|
| Case | 30-2 | 30-3 | 30-4 | 30-5 | S2 | S1 | S0 | Selection | Selected |
| p | 1 | 1 | 1 | 1 | 1 | 0 | 0 | 4 | Hub 11B |

Again, the switch 22B operates to provide tolerance to at least four failures and may once again permit more than four failures in particular circumstances.

It is believed to be apparent from the above that the network arrangement using the multiple hub nodes and implementing the principles of the internal switching device shown may be applied to higher levels of fault tolerance.

Figure 9:
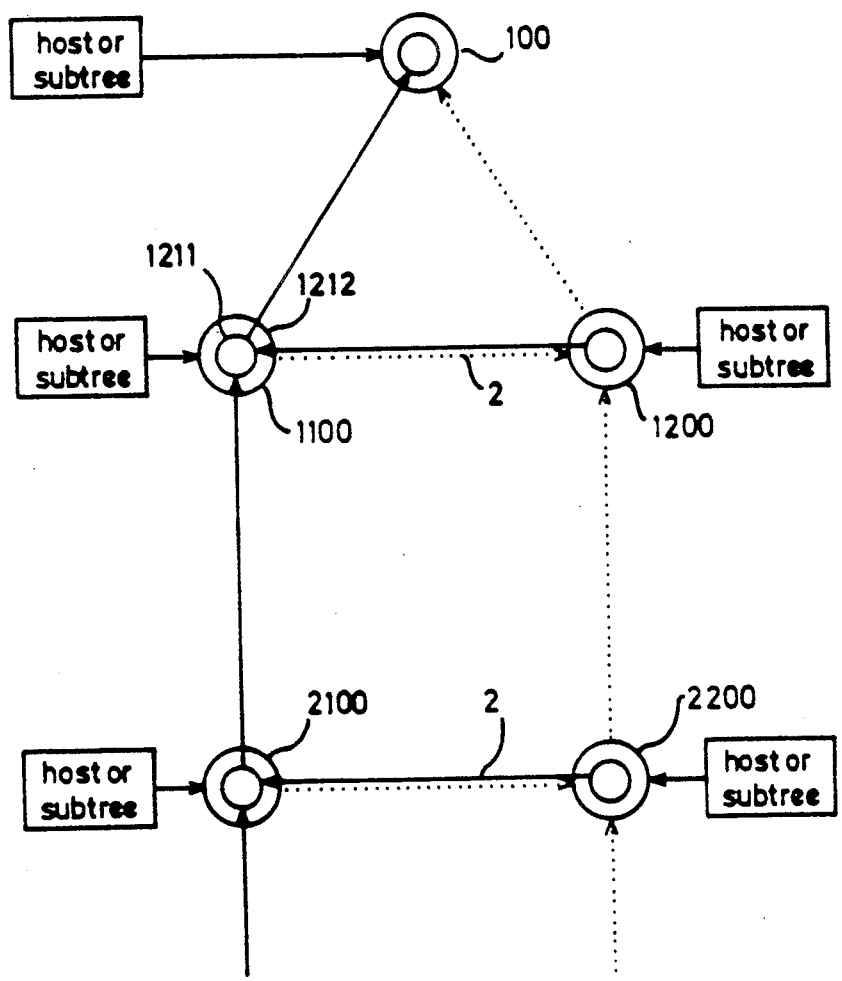
FIG. 9 is an abstraction of a network exhibiting tolerance to at least one failure.

Similarly, the principle may be applied to a tree network exhibiting tolerance to at least one failure by utilizing nodes with two hubs. As shown in FIG. 9, the lowest level hubs 12 are interconnected and receive data from the hosts 3 and the highest level hub 11 are interconnected. The nodes p00 are reconfigured by the switch 22 operating as described for the level 1 and 2 hubs in FIG. 4 above.

The above examples have all utilized similar node configurations in a tree network. The principles described above may however be utilized in other topologies with different attributes.

Figure 10:
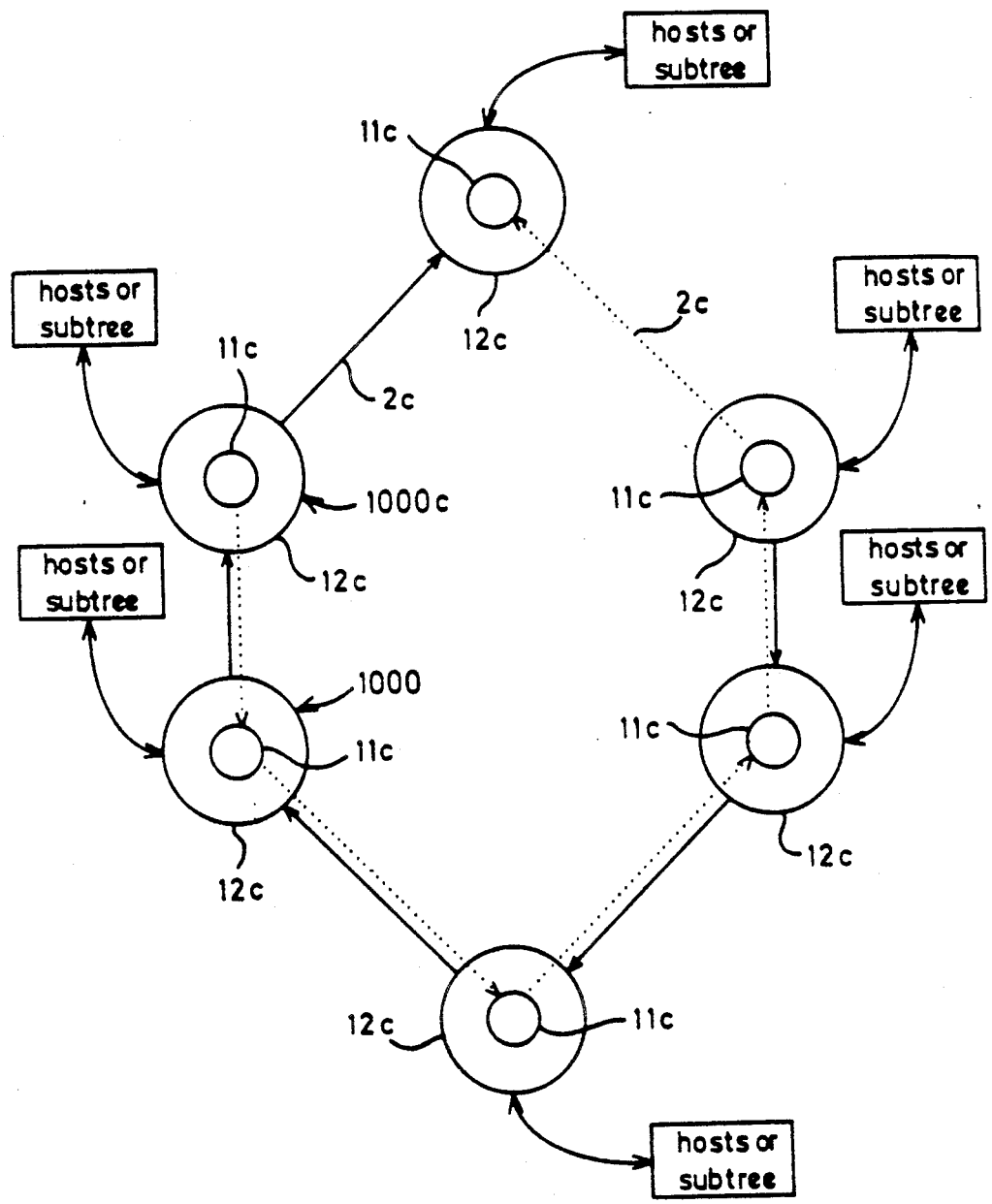
FIG. 10 is a representation of an alternative arrangement of the network of FIG. 9 and arranged to minimize the connections between the components of the network.

An example of an alternate topology is shown in FIG. 10 in which nodes 1000, each having two hubs, 11C, 12C, are arranged in a double ring network. Hosts 3C are connected to the lowest level hub 12C each of which has a link 2C connected to the hub 12C of the adjacent node. The higher level hub 11C of each node is also connected through a link 2C to the hub 11C of the adjacent node and it should be noted that the uplink direction of the two links extending between adjacent nodes is opposite one another and that all the links between the highest level hubs extend counter-clockwise.

In this configuration an internal switch means 22C utilizing the switches 22-1 and 22-2 shown in FIG. 4 is utilized.

Under normal conditions without any failure, data is transmitted through the lower level hubs 12 in a clockwise direction between the nodes. If a failure occurs in one of the links 2 between the hubs 12, the node detecting the lack of carrier reconfigures itself so that data is transmitted to the inner hub 11 and then counter-clockwise to each of the other hub nodes. In this case, one of the nodes indicated as node 100C acts as the central hub.

The arrangement shown in FIG. 10 is an alternative to the configuration shown in FIG. 9 for providing tolerance to at least one failure. It has the advantage of relatively simple connections for the links 2, but does require potentially longer paths for each of the data transmissions.

Figure 11:
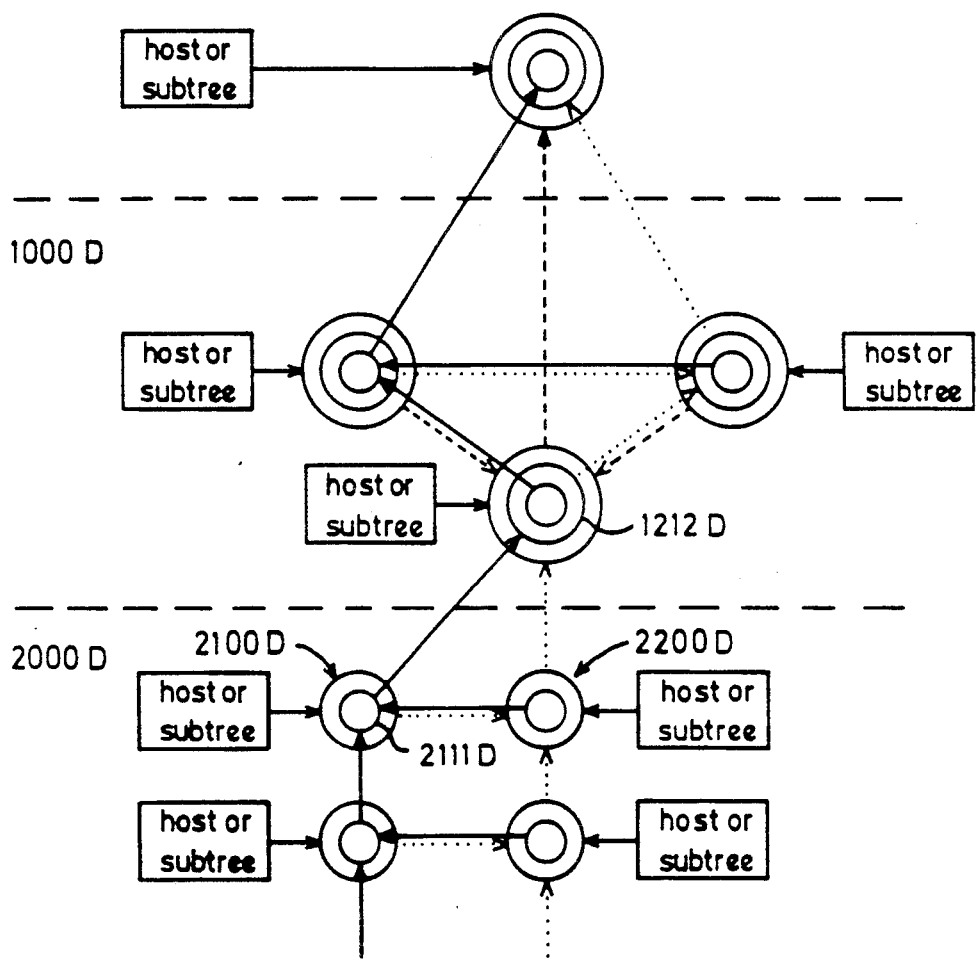
FIG. 11 is an abstraction similar to that of FIG. 1 showing a network having a portion tolerant to at least two failures, a portion tolerant to at least one failure and incorporating a ladder topology.

FIG. 11 illustrates an example of two forms of topology with two different levels of fault tolerance. In the arrangement in FIG. 11, a ladder topology is used in the stages 2000D and 3000D each with two levels of hub 10D. The nodes 2100D, 2200D connect to the tree network of stage 1000D with hub 2111D being connected to hub 1212D and hub 2212D being connected with hub 1212D. The nodes 100D and 200D of each stage are also interconnected by links 2D. Thereafter the network exhibits triple redundancy, i.e. fault tolerance for two failures in the manner illustrated in FIG. 1.

Figure 12:
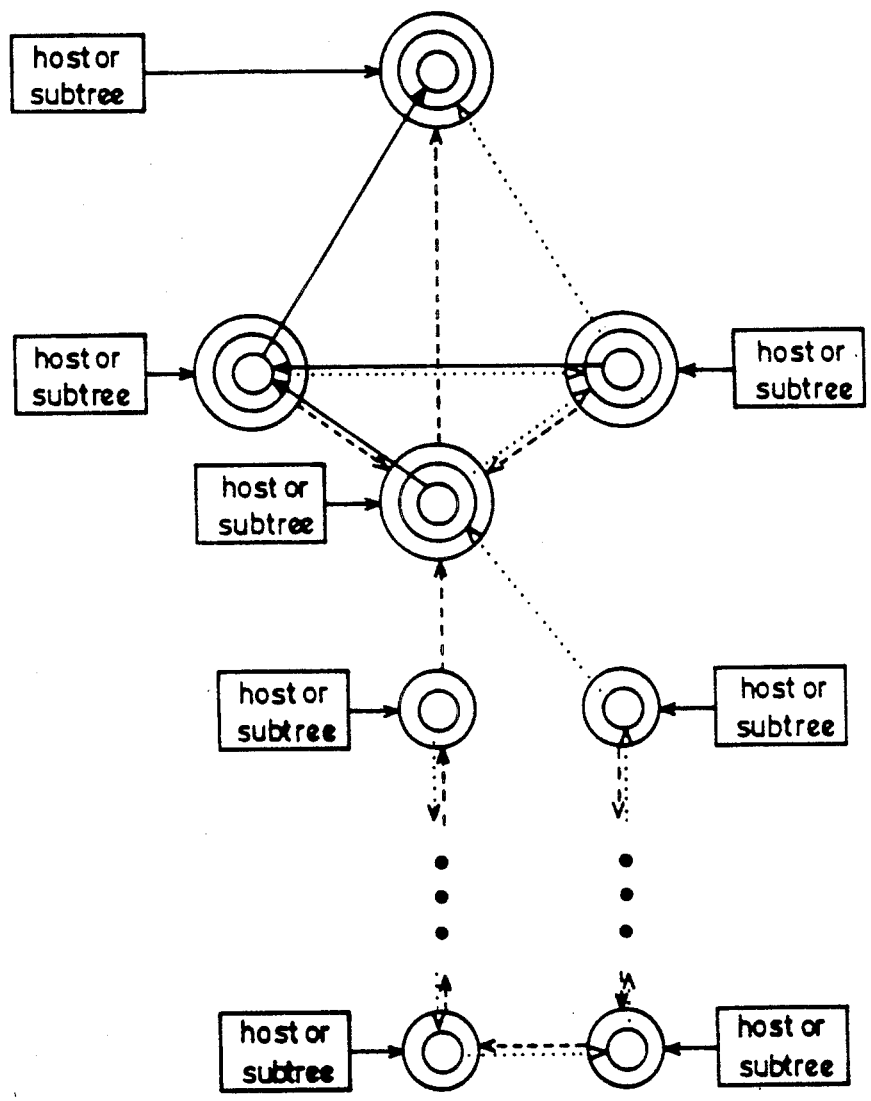
FIG. 12 is a representation of a network similar to that of FIG. 11 showing the incorporation of a ring topology.

A further arrangement is shown in FIG. 12 in which the ring topology shown in FIG. 10 is substituted for the ladder topology shown in FIG. 11. In this arrangement, interstage links are not utilized between the nodes of each stage resulting in simplified transmission networks but increased datapath.

Figure 13:
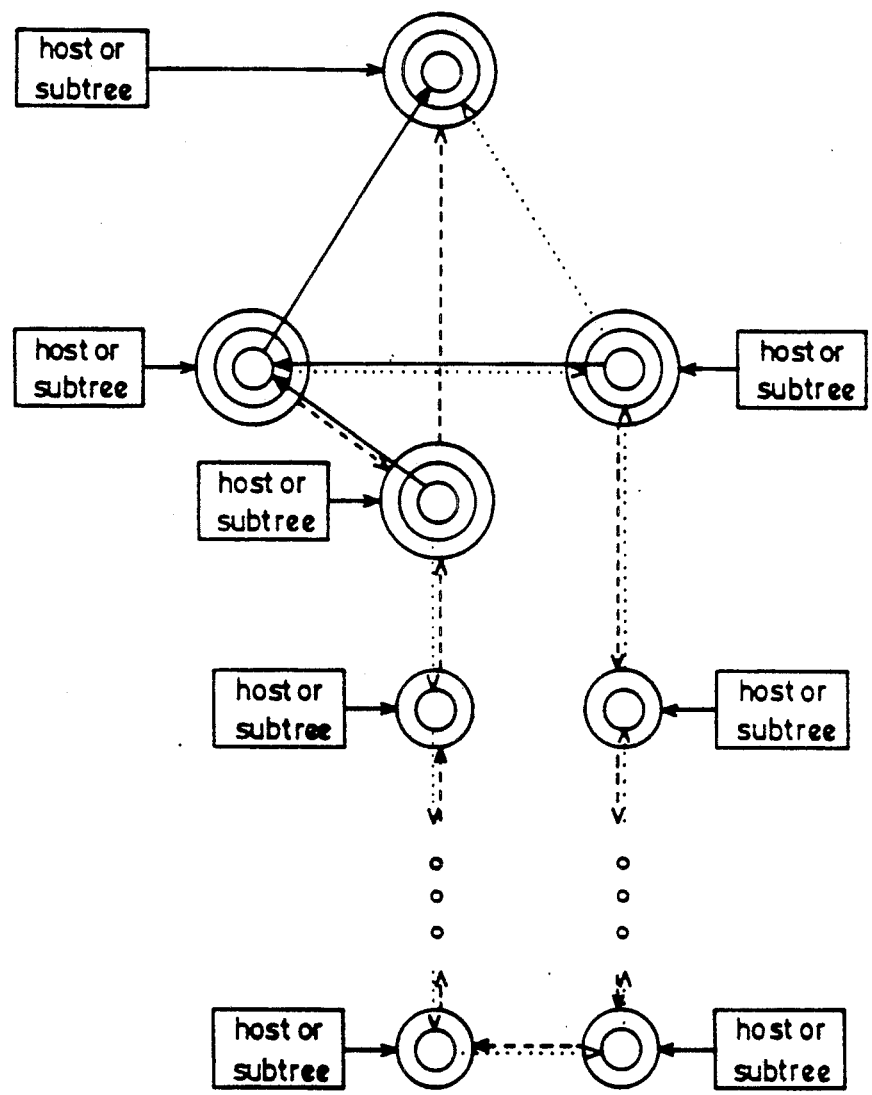
FIG. 13 is a representation similar to that of FIG. 12 showing the incorporation of a linear topology.

FIG. 13 shows yet further arrangement of mixed topologies in which a tree network exhibiting fault tolerance for two failures is combined with a dual redundant, i.e. fault tolerance for one failure, linear topology. It will be noted in this arrangment that interstage connections between nodes 1200 and 1300 are not utilized. In this case the data transmissions that would be handled by these interstage connections are instead handled by the linear arrangement illustrated.

It will therefore be appreciated that by combining a plurality of hubs and utilizing an internal switching arrangement in which failure detected in one link results in switching of the data to alternate links provides an enhanced degree of redundancy making the network capable of withstanding the desired number of failures in its components.

We claim:

1. A local area network arranged in a rooted tree topology comprising a plurality of access ports connected to one of a plurality of nodes, each node having at least one hub, each hub connected by data links to at least one other hub and each hub further including a selector to select one said data links for transmission through said network and broadcast means to transmit data to each of said data links connected to said hub, at least one of said nodes acting as a nexus whereby data from any access port is transmitted through the nexus to all access ports, at least one of said nodes being a multiple hub node having a plurality of hubs and having internal transmission means and switch means to control said internal transmission means, each hub of said multiple hub node further including detector means to detect failure in one said data link and to operate said switch means to establish communication between said hub and another hub of said multiple hub node through said internal transmission means.

2. A local area network according to claim 1 wherein nodes having a like minimum number of data links interposed between said nodes and said nexus are arranged in stages and the hubs of said multiple hub nodes in said stages are arranged in a hierarchial manner defining the precedence by which said switch means operates said internal communication means.

3. A local area network according to claim 2 wherein each of said data links is connected between hubs in different nodes.

4. A local area network according to claim 3 wherein any node in a first stage has only one hub directly connected to a hub in a second stage, said second stage having one less data link interposed between it and the nexus than does said first stage.

5. A local area network according to claim 4 wherein the balance of the hubs in said first stage are directly connected to hubs in the same stage.

6. A local area network according to claim 2 wherein a hub with a first precedence is directly connected to a hub of the same precedence in another node.

7. A local area network according to claim 2 wherein said multiple hub nodes in any one stage contain a number of hubs differing from that contained in multiple hub nodes in another stage.

8. A local area network according to claims 2 wherein any one of said nodes in any one stage contains the same number of hubs as all other hubs in said stage.

* * * * *